2,827,409

ELECTRIC ARC WELDING PROCESS

Karl Potzl, Munich, Germany, assignor to Gesellschaft für Linde's Eismaschinen Aktiengesellschaft, Hollriegelskreuth, near Munich, Germany, a German company No Drawing. Application September 22, 1952
Serial No. 310,937

Claims priority, application Germany October 11, 1951

4 Claims. (Cl. 148—26)

In the automatic arc welding process known as the Ellira process, the arc burns while submerged under a layer of granular slag-forming materials. With this process loss of energy due to radiation is minimized and the metal is protected against atmospheric oxidation so that substantially higher melting capacities are obtained than with exposed arc processes. The liquid metal bath is, however, sensitive to all influences which disturb the steady burning of the arc and the smooth flow of the slag. As welding compounds, therefore, there have hitherto been used substances which, at high temperature, form a smooth flowing slag without active reaction or the liberation of gases. In practically all cases, these are homogeneous and fully reacted silicates produced in the fused mass. The heterogeneous mixtures of substances which are generally employed in electric arc welding with coated electrodes and which only react with one another during the welding operation with formation of slag, have not been suitable for use in the submerged arc process since brisk foaming and development of gas occurs during the reaction of the components of the mixture.

Although the results obtained on cleaned rustless sheets with the usual fully reacted slags are good, there is nevertheless a very high sensitivity to impurities, which results in the formation of pores in the welded seam. In order to avoid this, the seam joint to be welded must be preheated by a burner preceding the welding head, so that moisture and impurities are evaporated and burned and the welding operation can then be carried out without difficulty.

The present invention relates to a heterogeneous granular product for use in the submerged arc welding process.

In accordance with the present invention a welding powder is produced simply and inexpensively by the use of which the weld is protected by a smooth flow of the slag during the entire welding operation and defect-free welds are produced. The process is extremely simple and therefore requires a minimum of time and assures a most economical utilization of the raw materials.

The composition of the mixture is so selected that its components react with one another exothermically during the welding but without any liberation of gas and as a result the metal and slag remain liquid longer and the formation of a smooth surface is facilitated.

By using a heterogeneous mixture exceptional latitude is made available with respect to the adaptation of the welding composition to the nature of the metal which is to be welded. Therefore, preferably as reacting substances, there are used those substances which it is desirable to have in the fused mass for metallurgical reasons.

The welded seam which is produced is generally free from pores even on rusty metal sheets and this insures high strength. It is therefore possible to use the composition even under unfavorable conditions when working in the open air for example, in bridge-building, etc.

In accordance with the invention slag-forming materials such as pyrolusite (40±10% by weight) and quartz (30±10% by weight) with flux material such as fluospar (15±10% by weight) and ferrosilicon (15±5% by weight) are mixed in finely divided form and stirred with 20% solution of sodium hydroxide in quantity sufficient to produce a moist mass. The sodium hydroxide may amount to about 4 to 6% of the weight of the dry mixture. The mass is then heated to a temperature sufficient to cause the sodium hydroxide and the ferrosilicon to react, e. g. 50–60° C., whereupon the reaction heat raises the temperature of the mass up to a temperature, at which water is expelled as steam and the mass gradually solidifies. During this reaction the mass is vigorously stirred and due to the evolution of gas is reduced to a porous granular state, the bulk of which is of a grain size suitable for use in the welding process. Finally the material is screened to separate grains of the desired size from larger and smaller grains and the separated granular product is heated to a red heat.

The oversize material may be crushed and screened again to recover an additional amount of material of the desired grain size and the fines are incorporated into the next batch of starting materials.

The heating of the material to red heat frees it of any residual, unreacted sodium hydroxide and water. The material may be heated in a stream of inert gases, preferably air, or in an externally heated rotating cylindrical kiln, with or without gases being passed through.

The addition of some alkali metal silicate, e. g. sodium silicate to the components to be mixed has proved to be desirable, but is not absolutely necessary.

Various additions to the composition described above may be made, such as ferromanganese, ferrochromium, etc., in quantities amounting to up to 10% by weight of the mixture. Such additions may be made for the purpose of introducing alloying ingredients into the weld metal.

By the reaction of the free alkali with the other constituents of the mixture at about 100° C., there is simultaneously obtained a drying action which proceeds uniformly, the slowness of the reaction rendering it possible that, in a kind of baking process, a large part of the mixture is directly obtained with the utilizable grain size.

The dust or fines which is separated by screening can with advantage be employed in the production of new mixtures, since the cost of heating to dull red heat, in comparison with the cost of material, does not constitute a preponderant portion of the total production costs as in the production of the welding compositions formerly employed, which had to be heated to such a high temperature that the material cost of the reemployed powder was unimportant.

In a welding composition produced by this method, the alkali present in the mass is combined in water-insoluble form and does not cause the mass to be hygroscopic.

Because of the low power requirements as compared with the former method of production, it is economically possible to use high-grade or expensive raw material, which render possible better quality welds.

It has been found from practical experience that it is also possible for rusty and dirty metal surfaces to be welded without delay with the welding compounds of the invention, thus further reducing the welding costs.

A particular advantage of heterogeneous mixtures of substances as welding compositions is that materials desirable on metallurgical grounds, for example, manganese or chromium, can be included in the welding composition which alloys these constituents into the welding metal at the heat of welding.

A specific example of a composition in accordance with the invention is as follows:

- .22 kg. of pyrolusite (80%)
- 15 kg. of quartz
- 7 kg. of ferrosilicon (80%)
- 3.5 kg. of ferromanganese (80%), and
- 2.5 kg. of fluorspar in finely divided form are mixed and stirred with 11 liters of 20% sodium hydroxid solution (about 2.67 kg. of NaOH) to the production of a viscous paste. After thorough mixing the mass is heated to about 50° to 60° C. to initiate a vigorous reaction between the ferrosilicon and the sodium hydroxid. Hydrogen is liberated by the reaction. As the reaction proceeds the mass is stirred. The temperature gradually increases to about 100° C., steam is evolved and the material gradually is converted into a mass of porous granules of which about 50% are of the desired size (0.25 to 2 mm. diameter). At the end of the reaction the granules are hard and dry.

As stated above, the granular mass is screened to separate the desired granular size from the oversize and undersize material. The fines may be added to the next batch to the extent of from one-fourth to one-third thereof. The separated granules of the desired size amounting to about 35 kg. (0.25–2 mm. diameter) is heated in a current of air for about one hour at about 600° C. to expel residual moisture and to eliminate free alkali by causing it to react with ferosilicon and pyrolusite to the formation of water-insoluble compounds.

In the foregoing example, in order to incorporate for instance chromium into the product the 3.5 kg. of ferromanganese may be replaced by, 2 kg. of ferromanganese and 2 kg. of ferrochromium. The amounts of ferrochromium may be increased if desired in order to increase the amounts of chromium that will enter into and alloy with the welding metal.

Another mixture in accordance with the invention is the following:

- 20 kg. of pyrolusite
- 16 kg. of quartz
- 8 kg. of ferrosilicon
- 1.5 kg. of ferromanganese
- 2.5 kg. of ferrochromium
- 2 kg. of fluorspar The addition of sodium silicate is generally unnecessary but may be employed to increase the hardness of the grains. For this purpose the caustic soda solution may contain about 10% by volume of a 40% sodium silicate solution, i. e. an amount of sodium silicate equal to up to about 0.2% of the weight of the dry composition.

The high porosity of the granules gives a greater volume per unit of weight and as a result the weight of material necessary to blanket the welding arc is less than it would be if the grains were not porous.

The final welding composition produced by heating the granules at red heat is, as stated, a heterogeneous composition. Although some chemical reactions occur during the production of the composition, e. g. the reaction of the sodium hydroxide with the ferrosilicon, the components remain principally unreacted until the heterogeneous composition is subjected to the temperature prevailing at the weld. At this point a homogeneous fully reacted slag is formed.

I claim:

1. Process for the production of a welding powder which comprises mixing 30 to 50 percent by weight of pyrolusite, 5–10 percent of weight of ferric oxide, 20 to 40 percent by weight of quartz with 5 to 25 percent by weight of a flux material consisting of fluorspar and 10 to 20 percent by weight of ferrosilicon, all in finely divided form, moistening the mixture with a 20 percent aqueous solution of sodium hydroxide to a pasty mass, heating the mass to a temperature of about 50–60° C. to initiate reaction between the sodium hydroxide and the ferrosilicon and vigorously stirring the mass whereby the temperature of the mass rises due to the heat of reaction to about 100° C., water is expelled, gas is evolved and the mass solidifies to a porous granular state.

2. Process as defined in claim 1 in which the mixture contains up to 10% by weight of material of the group consisting of ferromanganese and ferrochromium.

3. Process as defined in claim 1 in which the sodium hydroxide solution contains sodium silicate.

4. Process as defined in claim 1 in which the solidified porous mass is heated to dull red heat.

References Cited in the file of this patent

UNITED STATES PATENTS

| | | |
|---|---|---|
| 2,154,607 | Doom | Apr. 18, 1939 |
| 2,461,180 | Rollason | Feb. 8, 1949 |
| 2,474,787 | Landis | June 28, 1949 |
| 2,681,875 | Stringham | June 22, 1954 |